United States Patent [19]
Pascucci et al.

[11] Patent Number: 5,097,226
[45] Date of Patent: Mar. 17, 1992

[54] VOLTAGE-BOOSTED PHASE OSCILLATOR FOR DRIVING A VOLTAGE MULTIPLIER

[75] Inventors: Luigi Pascucci, Sesto S. Giovanni; Marco Olivo, Bergamo, both of Italy

[73] Assignee: SGS-Thomson Microelectronics s.r.l., Agrate Brianza, Italy

[21] Appl. No.: 655,049

[22] Filed: Feb. 14, 1991

[30] Foreign Application Priority Data
Feb. 16, 1990 [IT] Italy ................ 83604 A/90

[51] Int. Cl.$^5$ .............................................. H03K 3/03
[52] U.S. Cl. ........................................ 331/46; 331/57; 331/111; 331/DIG. 3
[58] Field of Search .......... 331/57, DIG. 3, 45, 331/46, 56, 74, 75, 111

[56] References Cited
U.S. PATENT DOCUMENTS 3,235,796  2/1966  Tarczy-Hornoch ........ 331/DIG. 3
3,350,659 10/1967  Henn ........................... 331/57

FOREIGN PATENT DOCUMENTS
61-251470 11/1986 Japan.

*Primary Examiner*—Siegfried H. Grimm

[57] ABSTRACT

A voltage-boosted phase oscillator for driving a voltage multiplier comprises two intermeshed ring oscillators, each composed by an odd number of inverters connected in cascade through a closed loop and generating a normal phase and a voltage-boosted phase derived from the normal phase through a bootstrap circuit. The frequency of oscillation of both intermeshed ring oscillators is established by means of two similar RC networks common to both loops. The synchronization of the respective oscillations of the two rings is ensured by means of a plurality of SR flip-flops connected in cascade, formed by two NAND gates which, singularly, constitute as many inverters of the two rings. The oscillation and the arresting of the oscillation are controlled by means of a logic signal fed to a common input of a first pair of NAND gates which constitute respectively a first inverter of the relative ring oscillator and to a second input of which the phase produced by the relative ring oscillator is fed.

4 Claims, 2 Drawing Sheets

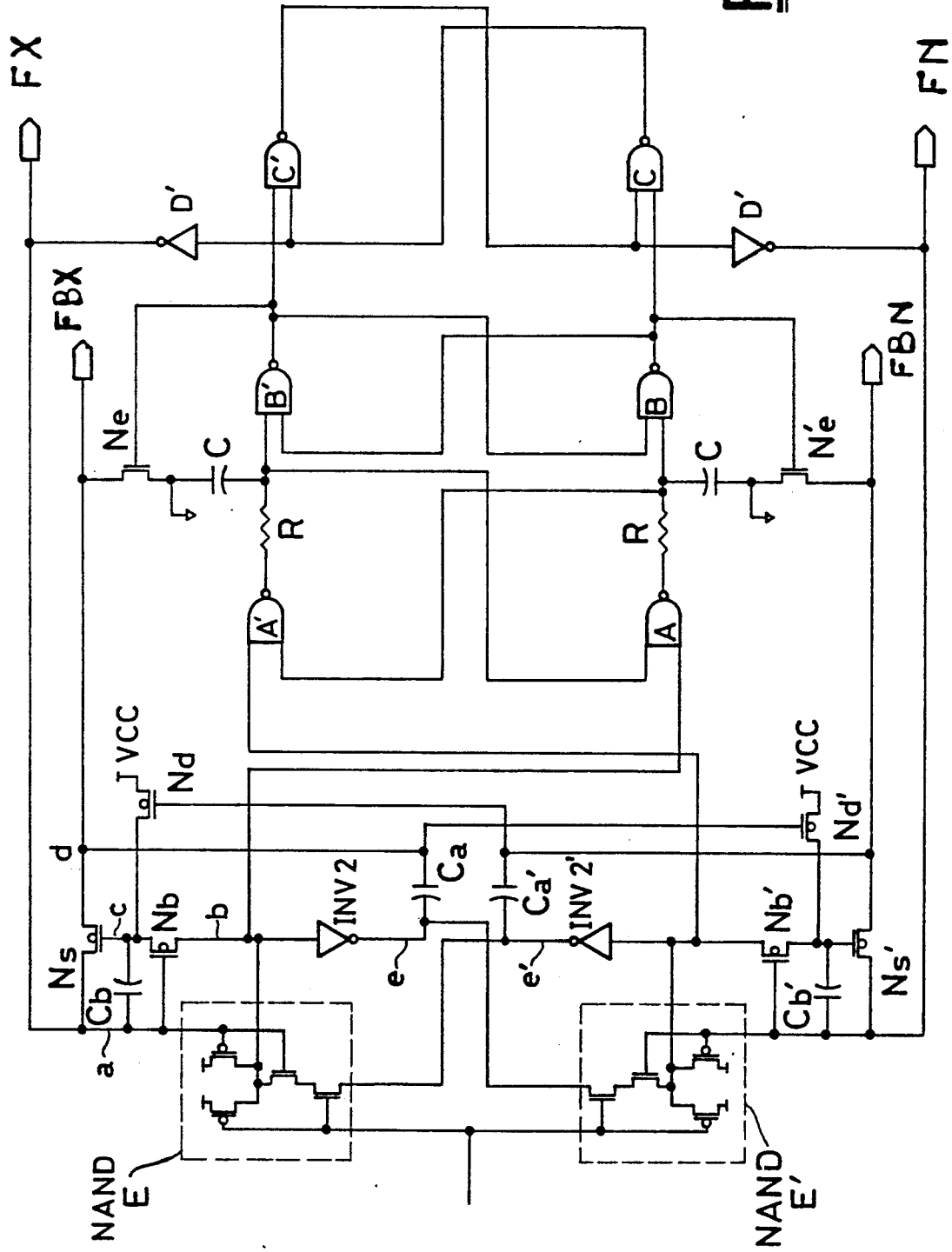

VOLTAGE-BOOSTED PHASE OSCILLATOR FOR DRIVING A VOLTAGE MULTIPLIER

BACKGROUND OF THE INVENTION

The present invention relates to an entirely integrated CMOS high voltage generator particularly suited for EEPROM memory devices and more in particular the invention concerns a voltage-boosted phase oscillator for driving a voltage mulplier circuit.

In integrated circuit (IC) where a voltage greater than the supply voltage of the device is needed, as in EEPROM memory devices, a peculiar circuit called voltage multiplier or voltage booster is used, which permits to obtain a voltage in the order of several decades of volts and is capable of delivering a current in the order of several decades of microampers (μA) starting from a supply voltage of e.g. 5V.

This type of circuit is amply described in literature and is commonly associated with an oscillator which produces two phase signals, opposite in phase to one another, which are needed for driving the electrical charge transfer through the various stages of the voltage multiplier, in an unique direction from a supply terminal to an output storage capacitor, across which the multiplied voltage is produced. Each stage of the multiplier is basically constituted by a transfer diode and by a storage capacitor. The oscillation of the driving oscillator may be controlled by an output voltage regulating network in order to keep the output voltage constant independently of the load and/or of variations of the supply voltage. Commonly a ring oscillator is used which is implemented by simply connecting in cascade an odd number of inverters and by closing in a ring the chain of inverters, thus preventing the occurrence of a stable state of the ring. The instability is further ensured by the large gain of the CMOS gates which are normally used as inverters.

On the other hand, the basic circuit of the voltage multiplier has lately undergone several developments which have markedly increased its efficiency.

A recently developed voltage multiplying circuit is shown in FIG. 1. The voltage multiplier utilizes single type, n-channel transistors, preferably of the so-called natural or depletion type which advantageously offer a threshold voltage to 0V and an internal resistance under conduction which is decisively lower than that of the so-called enhancement type transistors. The circuit, which is conceptually similar to the basic circuit made with diodes, requires for its functioning two pairs of phase signals, namely: FBX and FBN (voltage-boosted phases) and FX and FN (normal voltage level phases). The phases of the two pairs are out of phase by 180°. The normal level phases commonly have an amplitude equal to the supply voltage VCC, while the voltage-boosted phases have an amplitude larger than VCC.

Basically the limiting factor to ideality of operation of a voltage multiplier is represented by the inevitable presence of a threshold voltage of the transistors, which does not permit an ideal transfer of the charge from each stage to the successive stage and this becomes seriously penalizing when trying to obtain relatively high output voltage starting from a supply voltage (VCC) which is comparable, as order of magnitude, to the threshold voltage. Moreover the threshold voltage of MOS transistors suffers from the so-called "body effect" and the greater becomes the voltage, the greater becomes the threshold voltage, which tends to become equal to the amplitude of the phase signals provided by the driving oscillator. Therefore by increasing the number of the stages of the multiplier, a saturation condition is eventually reached which determines the maximum output voltage which can be practically obtained. The availability of a pair of voltage-boosted phase signals permits to obviate this phenomenon by increasing the gate voltage of the transistors which transfer the charges from each stage to the successive stage, e.g. of the transistor N2 of FIG. 1. The large capacitors C1 and C2 which provide the electric charges to the system for boosting the voltage on the output node OUT are connected to the normal, "not-boosted", phases FX and FN generated by the driving oscillator, while to the voltage-boosted phases FBX and FBN are connected smaller capacitors CB1 and CB2 because the circuit nodes driven by these transistors do not draw current, in fact they are connected to the gates of the transistors N2 and N1, respectively, which represent nodes having a substantially infinite impedance. In general, because the amplitude of the voltage-boosted phases, FBX and FBN, is markedly greater than the amplitude of the normal phases, FX and FN, also the nodes of the multiplier circuit driven by the voltage-boosted phases will be at a comparably higher voltage than the corresponding nodes driven by the normal phases FX and FN. By supposing that at a certain instant, the phases FX and FBX be rising in voltage, while the complementary phases FN and FBN be dropping in voltage, the nodes 1 and 3 will be coupled respectively by the capacitors C1 and CB1 and therefore will rise in voltage, on the contrary the voltage of nodes 2 and 4 will drop. At this stage the nodes 1 and 3 are not coupled among each other because the transistor N1 is off because the voltage of the node 4 is lower than the voltage of the node 3, being the node 4 driven by a dropping phase, and effectively the node 3 "sees" the infinite impedance of the gate of the transistor N2. The node 3 may thus reach a voltage higher than the node 1 and the transfer of charges from the node 1 to the node 2 may take place substantially without the loss of a threshold voltage until the voltage of the node 3 becomes greater than the voltage of the node 1 by at least the threshold voltage of the transistor N2 with the relative "body effect". On the contrary when, after half a period of oscillation, the node 1 drops and node 2 rises, similarly the node 3 drops and the node 4 rises, and therefore the decoupling transistor N1 switches-on and the transfer transistor N2 assumes a diode configuration, thus preventing the charges transferred during the preceding step from flowing back.

In a voltage multiplier of this type, any two complementary phase signals must essentially be always non-overlapped, i.e. they must never be simultaneously "high", because if such a condition would happen, a decrease of efficiency of the charge transfer process toward the output of the voltage multiplier, due to a back-flow of electrical charges caused by the simultaneous conduction of two adjacent stages of the circuit, would be observed.

OBJECTIVE AND SUMMARY OF THE INVENTION

A main aim of the present invention is to provide an oscillator having voltage-boosted phases for driving a voltage multiplier of the type described above, wherein the non-overlapping of the relative phases is positively ensured during every oscillation and under every operating condition of the oscillator.

This aim is achieved by an oscillator circuit which comprises two intermeshed ring oscillators, wherein each ring oscillator is formed by an odd number of inverters connected in cascade through a closed loop and generates a normal, not boosted, phase signal and a voltage-boosted phase signal, derived from the normal phase signal, in phase among each other and in phase opposition in respect to a normal phase and a similarly derived voltage-boosted phase which are produced by the other of the two intermeshed ring oscillators. For both the two intermeshed ring oscillators, the frequency of oscillation is established by a double RC network, common to both loops. The synchronization of the respective oscillations of the two intermeshed ring oscillators is established by means of a plurality of flip-flops connected in cascade, wherein each flip-flop is formed by two NAND-type, logic gates, which, singularly, form as many inverters of the two intermeshed ring oscillators. The oscillation and the arresting of the oscillation is controlled by means of an enable/disable logic signal which is fed to a first common input of a first pair of NAND gates, which constitute, respectively, a first inverter of the two intermeshed ring oscillators while to a second input of each of the two pair of NAND gates is respectively fed the phase signal produced by the relative ring oscillator. Moreover, the two NAND gates of said first pair constitute a first inverter of a relative bootstrap circuit for deriving a voltage-boosted phase signal from the normal phase signal produced by the respective ring oscillator.

BRIEF DESCRIPTION OF THE DRAWINGS

The different aspects and advantages of the circuit of the invention will become evident through the following detailed description of a preferred embodiment, shown in the attached drawings, wherein:

FIG. 3 is a detailed diagram of a preferred embodiment of the oscillator of the instant invention.

DESCRIPTION OF THE PREFERRED EMBODIMENT

Figure 2:
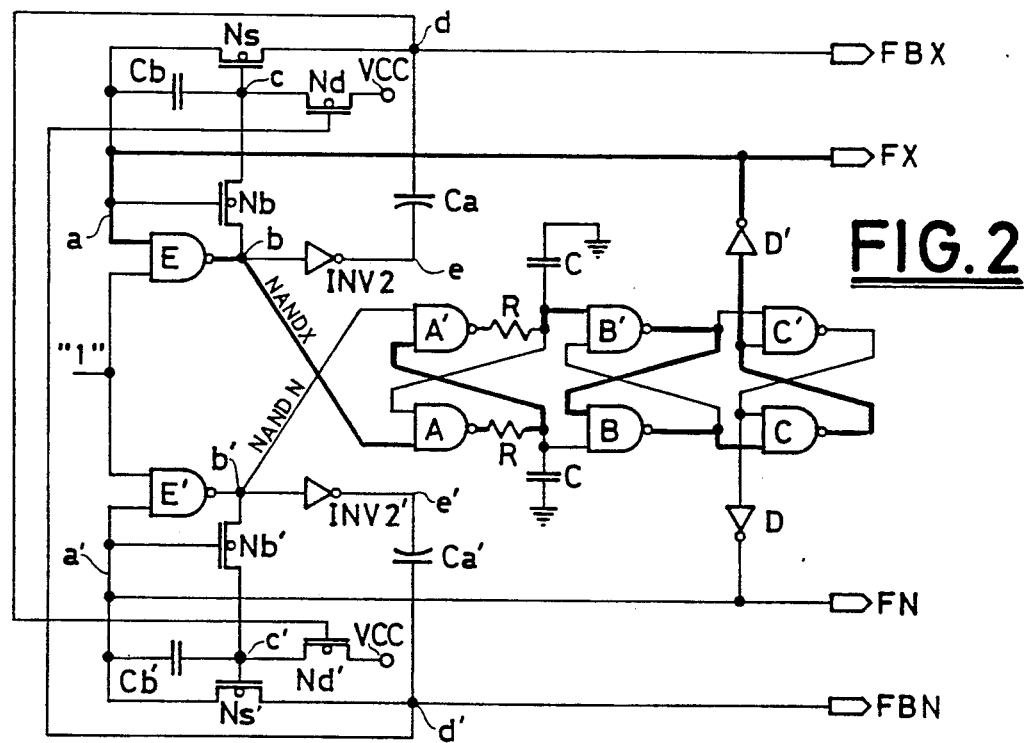
FIG. 2 is a basic diagram of a voltage-boosted phase oscillator, object of the present invention.

A functional diagram of the voltage-boosted phase oscillator circuit of the invention is shown in FIG. 2. For facilitating comprehension, the circuit of a first ring oscillator which generates a normal phase FX is evidenced in the figure by the use of a thick line for indicating the respective connections among the various components of such a first ring oscillator.

The first oscillator is formed by employing a first pair of NAND gates E and E', three SR flip-flops in cascade, each respectively formed by two cross-coupled NAND gates: respectively A-A', B-B', C-C' and by two inverters D and D'.

Notably, for one input, each NAND gate represents an inverter if the other input of the gate is at a logic "1" condition. The set condition of a flip-flop made with NAND gates is obtained viceversa by imposing a logic "$\phi$" state to the said other input.

It may easily be observed that the first ring oscillator, evidenced in FIG. 2 by the thick line connections, is composed by the following "inverters":

$$E \rightarrow A \rightarrow A' \rightarrow B' \rightarrow B \rightarrow C \rightarrow D' \rightarrow \quad (E).$$

Similarly the second ring oscillator is formed by the following "inverters":

$$E' \rightarrow A' \rightarrow A \rightarrow B \rightarrow B' \rightarrow C' \rightarrow D \rightarrow \quad (E').$$

The intrinsic frequency of oscillation of the two rings is established by means of a double RC network. Both the two identical RC networks are common to both rings.

The oscillation and the stopping of the oscillation of the two intermeshed ring oscillators is effected by feeding a logic signal to a common input node of the two NAND gates E and E'. Oscillation being enabled by applying a logic "1" signal to said common input node and the stopping of oscillation being determined when said logic signal assumes a logic "$\phi$" value.

Therefore the two ring oscillators oscillate in phase opposition to each other and the respective phase signals FX and FN are perfectly synchronized in phase opposition to each other and the presence in each of the ring oscillators of the flip-flops ensures the impossibility for one of the two phases to be at a logic high level simultaneously with the other phase.

From each phase (normal phase) generated by the respective ring oscillator a voltage-boosted phase is derived having an amplitude which is substantially double the amplitude of the normal phase which is generated by the ring oscillator and whose amplitude is substantially equal to the supply voltage (VCC). The voltage-boosted phase FBX is obtained by means of the circuit formed by a first inverter represented by the NAND gate E, by a second inverter INV2, by the transistors Ns, Nd and Nb and by the capacitors Cb and Ca. The operation of this voltage boosting circuit is as follows.

By assuming the nodes: a) at a logic low level, b) at VCC, e) at a low logic level, c) at VCC less a threshold because of the presence of the transistor Nd and d) at a logic low level, and by applying a rising ramp (FX) to node a) and by supposing that the node b) "reacts" with a certain delay due to the delay introduced by the first "inverter" which is represented by the NAND gate E and that therefore the node b) remains for such a delay period at its current level equal to VCC, a "bootstrap" effect is obtained on node c) because of the capacitor Cb, and therefore the entire voltage present on the node a) may transfer to the node d) without the loss of a threshold value relative to the transistor Ns. Therefore during this step the transistor Ns is well switched-on and the transistor Nb is cut-off because the node b) is still at VCC. If this delay step lasts for a sufficient period of time, it is possible to pre-charge completely the output capacitor Ca of the circuit to the VCC voltage, which represents a prime condition for the effectiveness of the circuit. At this point, the rising signal on node a) finally propagate to node b) which thence assumes the logic low level (ground potential), thus cutting-off the transistor Ns. The node d) is therefore isolated, and as soon as the signal from node b) propagates to node e), the voltage, now rising on e), projects the voltage of the node d) toward a level which is markedly higher than VCC, ideally toward a value which is twice the VCC value. Naturally this ideality of operation will be missed if the capacitors have losses and if the node d) must deliver a non-negligeable current to the driven circuit.

The transistor Nd, which could also be diode-connected, has instead its base driven by the voltage-boosted phase of the other ring (FBN). This permits to recharge the node c) not to a voltage equivalent to the supply voltage VCC less a threshold value, but to a full VCC voltage, thus improving the efficiency of the "bootstrapping" of the node c).

Of course the other voltage-boosted phase FBN is obtained in a totally similar manner by means of the respective circuit, which is identical to the above-described boosting circuit for the phase FBX.

A preferred embodiment of the circuit of the invention is depicted with greater details in FIG. 3.

As it is easily observed, the circuit of FIG. 3 is functionally equivalent to the circuit of FIG. 2. In particular, the two NAND gates E and E', are depicted in a detailed manner, each having a respective virtual ground terminal which is driven by a signal SWGNDX and SWGNDN, respectively, derived from the other ring oscillator. In this way a substantial delay in the propagation time of the signal through the same NAND gate is achieved so as to better ensure a complete recharging of the respective capacitors Ca and C'a, as previously described. Moreover, in this way, the non-overlap condition of the boosted phases is further ensured, because the "bootstrapping" of the phase FBX cannot take place until the phase FBN has reached ground potential, and vice versa.

The functioning of the circuit may be described as follows.

The node a), i.e. FX, rises in voltage and simultaneously the node c) rises too because of the coupling provided by the bootstrap capacitor Cb and of the isolation provided by the transistor Nb, which is deeply cut-off since node b) is high. It should be noted that the node c) has been well precharged to VCC by means of the transistor Nd, whose gate had been previously driven by the boosted phase FBN, i.e. by a signal which easily reaches a level almost twice the value of the supply voltage VCC. At the same time, in the other oscillating ring, the phases FN and FBN have decayed, i.e. have dropped in voltage to a ground potential, thus provoking the dropping of the node e'). The NAND gate E, having now its ground terminal at 0, may finally perform its logic function of inverting the input signal, and therefore the output node b) goes to 0V. The node c) is therefore pulled to ground by the transistor Nb, which is now conducting, thus cutting-off the transistor Ns and isolating the node d). At this point the signal, once the delay introduced by the second inverter INV2 has elapsed, propagates also toward the node e), which, by rising to VCC, couples the node d) through the capacitor Ca, and the phase FBX rises toward a level which is close to twice the value of the supply voltage VCC.

The "duration" of the "high" semi-period of the phases FX and FBX is determined by the succession of the two SR flipflops formed by the NAND gates A-A' and B-B', and connected among each other by interposing between the outputs of the first flip-flop (A-A') and the inputs of the second flip-flop (B-B') two identical RC networks, the time constant of which, summed together, determines the duration at the logic value "1" of the phases FX and FBX, and therefore also the duration at the logic level "φ" of the dual phases FN and FBN. In fact, the phase FN cannot rise again until the node b) performs the setting of the flip-flop A-A', which propagates to the third flip-flop C-C' thus activating the rise of the phase FN and the fall of the phase FX. Moreover, because the outputs of an SR flip-flop implemented with NAND gates always encounter during a commutation the condition of both being at a logic state "1", as a consequence the phase signals FX and FN will never simultaneously be at a logic "1", thus ensuring the required "non-overlapping" for a correct operation of the voltage multiplier.

Figure 1:
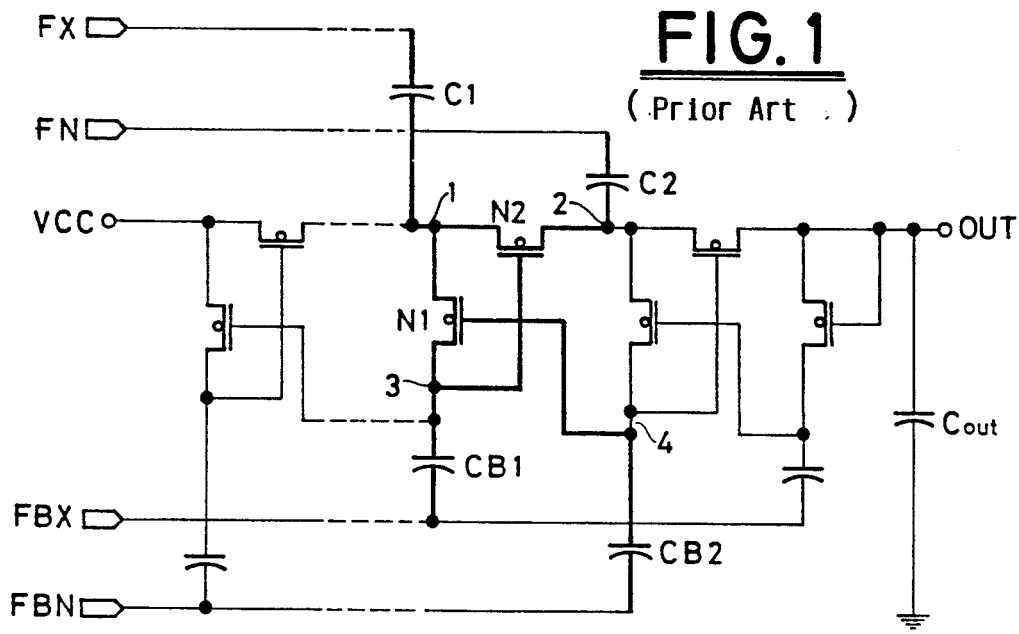
FIG. 1 is a circuit diagram of a voltage multiplier driven with voltage-boosted phases, of the known type described previously.

Another condition for a more efficient operation of the voltage multiplier is that the voltage-boosted phase fall to ground before the respective normal, not boosted phase signal. Should this not be the case, the transistor N2 of the voltage multiplier, shown in FIG. 1, would not cut-off completely, thus causing a back-flow of electrical charges. That condition is ensured in the oscillator circuit of the invention depicted in FIG. 3, by the delay introduced by the flip-flops B-B' and C-C'. When the node f) goes to a logic "1", it activates through the transistor Ne the discharging to ground potential of the phase FBX, but before that, also the phase FX drops to ground potential, the signal from the node f) must still propagate through the second gate (B) of the second flip-flop and then across another gate (C) of the third flip-flop before, having been inverted by the inverter D', finally reaches the FX phase rail. Everything which has been said in relation to FX and FBX is similarly true also for the phases FN and FBN when, in a dual mode, the following half-period of operation is considered, i.e. when the discharge of FBX and FX permits the rise of FN and the initiation of the precharge cycle of the capacitor Ca' which leads to the generation of the voltage-boosted phase FBN, thus achieving the objective of synchronizing both pair of phases.

As shown in FIG. 3, the circuit is preferably made with depletion type n-channel transistors, even though in a less efficient way the circuit could also be made with common enhancement type transistors.

It should be noted also that only the transistors Ne and Ne' used for discharging the boosted phases to ground are preferably of the enhancement type which hold more securely in a cut-off condition.

What we claim is:

1. A voltage-boosted phase oscillator for driving a voltage multiplier comprising two intermeshed ring oscillators, each composed of an odd number of inverters connected in cascade through a closed loop and generating a normal phase and a voltage-boosted phase derived from said normal phase, in phase coincidence between each other and in phase opposition with the normal phase and the voltage-boosted phase produced by the other of said two intermeshed ring oscillators, and whose frequency of oscillation is established by means of two identical RC networks common to both ring oscillators;

the synchronization of the oscillations of the two intermeshed ring oscillators being established by means of a plurality of flip-flops connected in cascade, each formed by two NAND gates which, singularly, constitute as many inverters of said two intermeshed ring oscillators;

the oscillation and the arresting of oscillation being controlled by means of a logic signal fed to a common input of a first pair of NAND gates which respectively constitute a first inverter of one and of the other of said two intermeshed ring oscillators while to a second input of the NAND gates of said first pair is fed the normal phase signal produced by the respective ring oscillator.

2. An oscillator according to claim 1, wherein each of said voltage-boosted phases is derived by the respective normal phase generated by the relative ring oscillator of said two intermeshed ring oscillators, by means of a bootstrap circuit formed by a first inverter connected between an input node of said bootstrap circuit to which said normal phase is fed; a first transfer transistor connected between said input node and an output node of the circuit on which is produced said voltage-boosted phase and having a gate which is connected to a first intermediate node which is kept at a voltage substantially equal to the supply voltage of the circuit by means of a second transistor which is functionally connected between said first intermediate node and a supply voltage rail, said first intermediate node being coupled by means of a third transistor whose base is connected to said input node, to a second intermediate node which coincides with the output node of said first inverter; a first bootstrap capacitor connected between said input node and said first intermediate node; a second output capacitor connected between said output node and a third intermediate node of the circuit; a second inverter connected between said second intermediate node and said third intermediate node of the circuit;
said first inverter being formed by said NAND gate which constitutes the first inverter of the relative ring oscillator;
said second transistor having a gate connected to the other of said two voltage-boosted phases.

3. An oscillator according to claim 2, wherein said third intermediate node of the circuit is connected to ground potential of the NAND gate which constitutes the first inverter of the other of said two intermeshed ring oscillators for ensuring the non-overlapping between said two voltage-boosted phases generated.

4. An oscillator according to claim 1, wherein said voltage-boosted phases, during a fall in voltage reach ground potential before the respective normal phases from which they are derived, by being discharged to ground through a transistor which is driven by the voltage present on an intermediate node of the respective ring oscillator circuit on which the logic transition is anticipated in time in respect to the transition of an output node of the normal phase signal produced by the same ring oscillator.

* * * * *